United States Patent Office 3,528,952
Patented Sept. 15, 1970

---

3,528,952
POLYSULPHONES PREPARED FROM SULFUR DIOXIDE AND CIS,TRANS-CYCLODECA-1,5-DIENE
Pierre Lafont, Ste.-Foy-les-Lyon, and Gilbert Vivant, Lyon, France, assignors to Rhone-Poulenc S.A., Paris, France, a French body corporate
No Drawing. Filed Dec. 12, 1966, Ser. No. 600,766
Claims priority, application France, Dec. 20, 1965, 43,012
Int. Cl. C08f 13/06
U.S. Cl. 260—79.3    1 Claim The present invention relates to polysulphones and their preparation.

It is known to prepare polysulphones from sulphur dioxide and olefines having one or more double bonds. Known polysulphones, however, generally have poor thermal stability and the disadvantage of depolymerising at elevated temperature with liberation of the starting materials. Moreover, the polysulphones of linear diethylenic hydrocarbons are generally highly cross-linked.

According to U.S. Pat. No. 3,133,903, it is possible to obtain linear polysulphones from cycloocta-1,5-diene and sulphurous anhydride. These polymers contain the unit:

$$\begin{array}{c}-CH-CH-CH_2\\ | \quad | \quad |\\ CH_2\ SO_2\ CH_2\\ | \quad | \quad |\\ CH_1-CH-CH-SO_2-\end{array}$$

which is bicyclic and contains two residues of sulphur dioxide for each residue of cyclooctadiene. A linear polysulphone has also been prepared from norbornadiene the unit of which possesses a complex polycyclic structure [Alexander et al. Polymer Letters 1, 625–27, (1965)].

The present invention provides a new linear polysulphone containing a bicyclic unit, but containing only one residue of sulphur dioxide in each unit.

The new polymer consists of units of the formula:

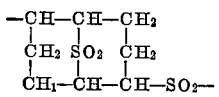

It may be prepared by contacting sulphur dioxide with cis,trans-cyclodeca-1,5-diene. The reaction may be represented as follows:

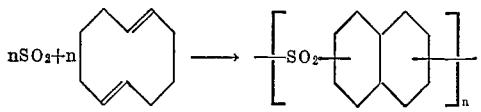

in which $n$ represents an integer.

Cis,trans-cyclodeca-1,5-diene can be readily obtained. It may be prepared by co-oligomerising butadiene with ethylene in the presence of, as catalyst, organometallic complexes of nickel which are free from carbon monoxide. Such a process is described, for example, in French Pat. No. 1,351,938.

The preparation of the new polymer may be carried out with or without a solvent. When a solvent is employed liquids which are inert under the operating conditions may with advantage be employed, such as tetramethylene sulphone and dimethylsulphoxide. The reaction may also conveniently be carried out in an excess of liquid sulphur dioxide.

The polymerisation is generally carried out at temperatures between −25° and +50° C. Although these temperatures do not constitute absolute limits, there is substantially no advantage in departing therefrom, because the speed of the reaction decreases considerably below −25° C. On the other hand, it is known, for example from French Pat. 1,386,991, that cis,trans-cyclodeca-1,5-diene is readily isomerised by heating into divinylcyclohexane in accordance with the transposition:

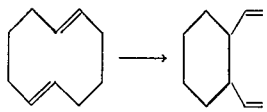

so that undue heating of the reactants must be avoided.

Although the polymerisation may be carried out by simple contact of the reactants, the reaction is facilitated by adding to the reaction mixture small quantities of a free radical-generating catalyst, e.g. benzoyl peroxide, azobisisobutyronitrile, ascaridol in the presence of hydrochloric acid, or methylethylketone peroxide.

As is apparent from the equation given above, the polymerization theoretically requires equimolecular quantities of the reactants. In practice, however, it is advantageous to employ an excess of sulphur dioxide, for example up to 10 mol. of sulphur dioxide per mol. of the cyclodecadiene. This excess of sulphur dioxide does not influence the composition of the final polymer, which remains substantially constant.

The preparation of the new polymer may be carried out as follows. A mixture of cis,trans-cyclodeca-1,5-diene, the catalyst chosen for the reaction and, where necessary, a solvent is first cooled, and liquid sulphur dioxide is then added. The final mixture is maintained at the desired temperature for the time necessary to complete the polymerisation.

If it is desired to carry out the reaction at a temperature above the boiling point of the mixture, the reactants may be introduced into an autoclave and the whole may be brought to the temperature chosen for the polymerisation. When the polymerisation is complete, the polymer formed may be isolated by any usual method of separation, for example by filtration or by precipitation followed by filtration, after elimination of the excess of sulphur dioxide.

The new polymer is a white powder of high melting point and good thermal stability. The melting point and the solubility in solvents such as dimethylformamide, dimethylsulphoxide and tetramethylene sulphone may vary slightly in accordance with the catalyst employed. The solubility is, generally speaking, higher as the polymerisation is slower and as the reaction mixture is more highly diluted.

Solutions of the new polymer can readily be used in the production of films by the usual methods. The polymer may also be moulded under pressure at temperatures of the order of 220° C. The moulded objects thus obtained are not degraded when subjected to the action of concentrated sodium hydroxide solution.

The following examples illustrate the invention.

EXAMPLE 1

The apparatus employed is composed of a cylindrical borosilicate glass vessel provided with a central stirring system and a reflux condenser through which a fluid at −40° C. is passed. 3.4 g. (25 millimol.) of cis,trans-cyclodeca-1,5-diene and 50 mg. of benzoyl peroxide are introduced into the vessel, and the whole is cooled to −10° C. 4.8 g. (75 millimol.) of sulphur dioxide are then introduced, and the mixture is stirred for 4 hours while the temperature is maintained at −10° C. The mixture is then allowed to heat up, and it sets at +5° C.

After distillation of the excess of sulphur dioxide, the solid mass is dissolved in dimethylformamide and the polymer is reprecipitated by the addition of ethanol. The polymer is then filtered off and dried in vacuo at 110° C. for 8 hours. 2.1 g. of a white powder melting at 270° C. are thus obtained, containing 15.29% by weight of sulphur. The intrinsic viscosity of the powder, determined at 25° C. on an 0.2% solution in dimethylformamide is 0.4.

Part of the polymer is dissolved in deuterated dimethylsulphoxide and the solution obtained is studied by nuclear magnetic resonance. The results show that the polymer unit contains the bicyclic hydrocarbon radical

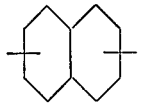

derived from decahydronaphthalene.

EXAMPLE 2

Into a 12.5-cc. autoclave 3.4 g. of cis,trans-cyclodeca-1,5-diene and 50 mg. of benzoyl peroxide are introduced, and the whole is cooled to −30° C. 4.8 g. of sulphur dioxide are then added and, when the autoclave has been sealed, the mixture is left at ambient temperature with stirring for 4 hours. The excess of sulphur dioxide is then eliminated and the solid residue is worked up as in Example 1.

4.8 g. of polymer containing 15.28% by weight of sulphur are thus obtained, the intrinsic viscosity of which, determined as in Example 1, is 0.65. This polymer melts at 295° C. 4 g. thereof are dissolved in 20 cc. of dimethylformamide and the solution obtained is spread on two glass plates so as to form films having thicknesses of 0.3 and 0.5 mm. respectively. The solvent is allowed to evaporate at 40° C. for 6 hours. After washing with water, flexible transparent films are obtained which readily detach from their support.

EXAMPLE 3

The procedure of Example 1 is followed, the benzoyl peroxide being replaced by 3 drops of ascaridol and 3 drops of concentrated hydrochloric acid, the operation being carried out with stirring and with reflux of the sulphur dioxide. At the end of 30 minutes, the mixture sets. The solid product is then washed with methanol, ground, and dried in vacuo at 40° C. 5 g. of a white powder are obtained, M.P. 325° C.

EXAMPLE 4

The reaction is carried out as described in Example 2, the benzoyl peroxide being replaced by 50 mg. of azobisisobutyronitrile, and the autoclave being left at ambient temperature for 6 hours. The solid residual product is washed with water and ethanol and dried, and 3.4 g. of a white powder, M.P. 330° C., sparingly soluble in dimethylsulphoxide, dimethylformamide, cyclohexanone and pyridine are obtained.

EXAMPLE 5

Cis,trans-cyclodeca-1,5-diene and sulphur dioxide are reacted under the conditions described in Example 1, the benzoyl peroxide being replaced by 50 mg. of methylethylketone peroxide. The mixture sets at the end of 30 minutes. The solid residue is washed with alcohol and dried, and 2.4 g. of polymer, M.P. 285° C., sparingly soluble in dimethylsulphoxide, dimethylformamide and cyclohexanone, are obtained.

EXAMPLE 6

The operation is carried out as in Example 1 in the presence of 15 cc. of tetramethylene sulphone. At the end of 15 minutes, the solution has thickened considerably. When the excess of sulphur dioxide has been eliminated, the polymer is precipitated from its solution by the addition of methanol and then worked up as in Example 1. 4.4 g. of polymer, M.P. 312° C., are thus obtained, soluble in tetramethylene sulphone.

EXAMPLE 7

The polymerisation is carried out as in Example 1, but with a larger quantity of sulphur dioxide (16 g., 250 millimol.), the mixture being stirred for 2 hours with reflux of the sulphur dioxide. The excess of the latter is then distilled off, the mixture being allowed to heat up gradually. The mixture solidifies when it reaches ambient temperature, and is worked up as in Example 1. 2.4 g. of polymer, M.P. 290° C., are obtained, soluble in dimethylformamide and dimethylsulphoxide.

EXAMPLE 8

The procedure of Example 7 is followed, but with 4.8 g. of sulphur dioxide and using no catalyst, the mixture being stirred for 2 hours. 1.2 g. of polymer, M.P. 300° C., are obtained.

We claim:
1. A solid linear polymer consisting of units of the formula:

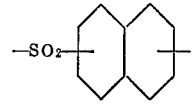

References Cited

UNITED STATES PATENTS 3,133,903 5/1964 Frazer.
3,331,819 7/1967 Spainhour.

JAMES A. SEIDLECK, Primary Examiner

U.S. Cl. X.R.

260—30.2, 30.8, 32.6